July 22, 1969  W. H. CARNAHAN  3,456,265
SWIMMING POOLS

Filed Aug. 15, 1967  2 Sheets-Sheet 1

WALTER H. CARNAHAN
INVENTOR.

July 22, 1969 W. H. CARNAHAN 3,456,265
SWIMMING POOLS
Filed Aug. 15, 1967 2 Sheets-Sheet 2

WALTER H. CARNAHAN
INVENTOR.

United States Patent Office 3,456,265
Patented July 22, 1969

3,456,265
SWIMMING POOLS
Walter H. Carnahan, 99 Van Voorhis Ave.,
Rochester, N.Y. 14617
Filed Aug. 15, 1967, Ser. No. 660,833
Int. Cl. E04h 3/14
U.S. Cl. 4—172                        4 Claims

ABSTRACT OF THE DISCLOSURE

This invention provides for a hygienic swimming and bathing area within the limits of a larger body of water, which may be polluted, produced by positioning an essentially vertical, impermeable, flexible membrane in a continuous form from at least one point on the shoreline of the large body of water to contain and segregate at least a portion of it so that the contained portion of water is available for purification and clarification, and other treatments.

---

Figure 1:
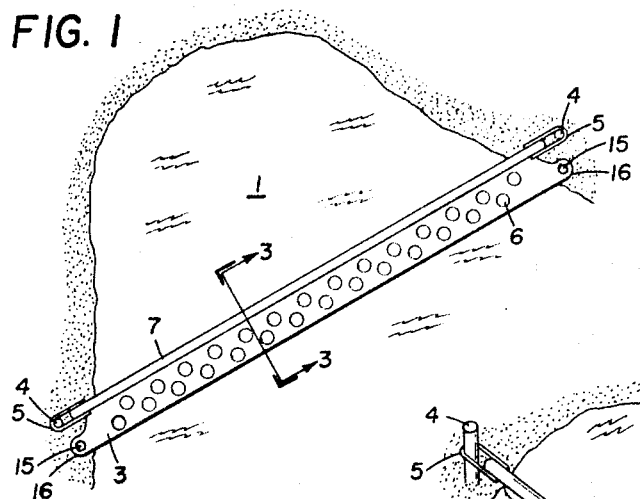

This invention relates to improved swimming and bathing areas; and in one of its aspects, this invention relates to a safe, sanitary swimming area incorporated in, but separated from, a larger body of water.

Bathing or swimming in natural bodies of water has always presented dangers from swift currents, undertows, tides, sudden changes in the contour of the bottom, and so forth. In addition, seaweeds, certain fish, sea nettles, and the like, can be a problem. A very great and growing hazard is the increasing pollution of lakes and streams with industrial wastes, with inadequately treated sewage, and with the miscellaneous discards of our everyday living. As a result, many creeks, rivers, ponds, and lakes which once provided excellent bathing areas have become contaminated and unfit for swimming and bathing.

Most of the effort to provide safe and sanitary swimming areas has been directed to the construction of artificial swimming pools. Unfortunately, these are expensive to build and maintain, and moreover, without greatly increasing the problems of construction they usually cannot be positioned in appropriate settings associated with natural bodies of water. Swimming pools have been built in existing bodies of water and these have much to recommend them since they place the swimmer in a more pleasant enviroment. They are expensive, however, and in many ways more difficult to maintain than shore-based pools.

There are accordingly pressing needs for simple, economical means for providing safe bathing areas of water which overcome the dangers inherent in natural bodies of water, particularly the problems associated with unwanted biological growth, organic wastes, and industrial pollution.

I have devised such a safe bathing area and a process for constructing it quickly and economically. The construction materials are capable of repeated seasonal reuse and can be stored compactly between periods of use. Little or no maintenance is required. The water within the bathing area of the invention can be readily maintained to a desirable point of clarity and biological purity.

It is thus an important object of the present invention to provide an improved, relatively inexpensively constructed safe bathing area adapted to provide suitable bathing water within the limits of a lake, stream, ponds, or other body of water which is unsuitable for swimming in its present condition. It is another object of this invention to provide simple, economical methods for constructing safe bathing areas within the limits of existing bodies of water.

It is another object of this invention to provide an improved bathing area which is more simply constructed than swimming pools or other rigid structures and which has been reduced in cost through the elimination of a number of parts and quantity of materials.

It is a further object of this invention to provide a safe bathing area, the surface or exterior of which contains a membrane with may be readily repairable.

Another object of this invention is to provide a bathing area wherein the natural surroundings provide at least a part of the bathing area. Such natural parts include the shoreline and the bottom of the area.

Another object of this invention is to provide within an existing body of water, an improved low cost swimming pool wherein the biological purity, temperature, salinity, and currents can be controlled independent of the condition of the existing body of water.

It is still another object of this invention to provide methods and means for compensating for variations in level and hydraulic pressure between the water in the bathing area and that in the balance of the body of water outside the bathing area.

In its simplest form, my invention comprises the process of separating a portion of an existing body of water by means of a flexible membrane which is positioned in the water so that it forms a water impermeable barrier from a point on a shore to a second point on the same shore, said barrier reaching at least to the natural bottom and at least above the surface of the body of water.

Preferred forms of swimming areas made according to my invention include weighting means to facilitate keeping the flexible membrane in intimate leak-resistant contact with the bottom and flotation or other means to facilitate keeping the upper edge of the membrane above the surface. A membrane may be chosen which is lighter than water and so tends to float, or it is made lighter than water by affixed flotation devices like air cells, plastic foam, or the like. One important aspect of certain embodiments of my invention is the provision of sufficient scope in the membrane to permit the top edge to move independently of the bottom in order to compensate for changes in the respective levels of the water on the two sides of the membrane.

The segregated pool might be used as an area so that livestock and the like can be readily watered in purified water. The separated pool may also be used as reservoirs for varying degrees of purity.

These and other detailed specific objects will be disclosed in the course of the following specification with reference to the accompanying drawings.

Figure 2:
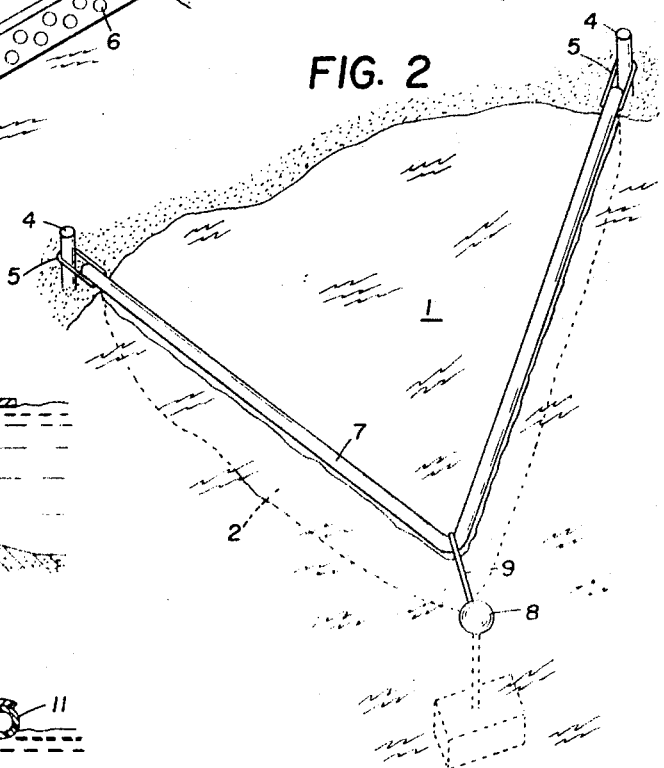

FIG. 1 is a plan view of the bathing area according to one of the simplest demonstrations of my invention; FIG. 2 is another modification of this invention without the apron attached. FIGS. 3A, 3B, 5, 6, 7, and 8 show the membrane held at the bottom and at the top by either a floating member or a rigid support, having as an optional addition, an apron acting as a wave suppression device that may be on the surface or above the water.

Figure 4:
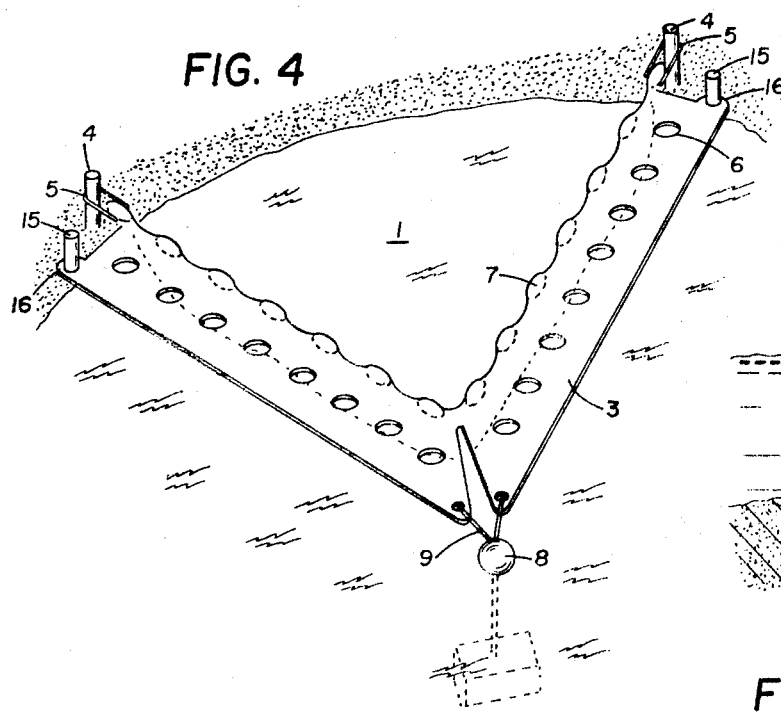

FIG. 4 is a modification of FIG. 2 wherein the device to hold the membrane above the water at its upper edge is a plurality of floats linked together with a cable, rope, or the like and where the outer portion of the apron which may be an extension of its membrane is supported at the buoy and on the shore. The apron can also be attached to the shore by post 15 connected by an engaging means 16.

Referring now to the figures and particularly to FIGS. 1, 2, and 4, there is shown the bathing area confined to the desired portion of a large body of water 1, by an essentially vertical membrane 2, optionally having a wave suppression apron 3, fixed to the position on the shore and by a post 4 by a fastening means 5. The floating or rigid framework 7 supports the upper edge of the membrane above the surface of the water. The wave suppression apron 3 optionally contains holes 6 to allow water to enter or depart depending on the wave flow. Referring specifically to FIGS. 2 and 4, the buoy 8 is attached to a weight on the bottom of the body of water and is attached to the membrane or the upper framework 7 by a rope or cable 9 in one or more positions to maintain the confined water at any desired location. Other means can be used to maintain constant tension on the apron such as tension provided by a weight and pulley arrangement.

Figure 3A:
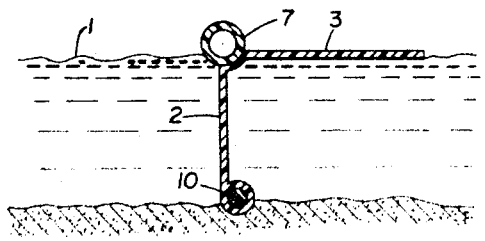

FIG. 3A is a cross section 3—3 of FIG. 1 wherein is shown the water 1 confined by the membrane 2 which is supported by a floating means 7 having an apron 3 which rests on the water. The membrane 2 is held against the bottom of the body of water by a weight means 10.

Figure 3B:
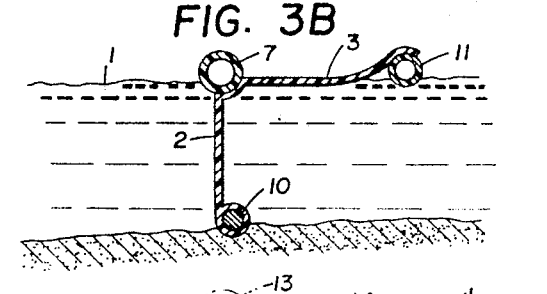

FIG. 3B is a modification of FIG. 3A wherein an additional floating means 11 is attached to the outside edge of the apron to assist in the wave retardation.

Figure 5:
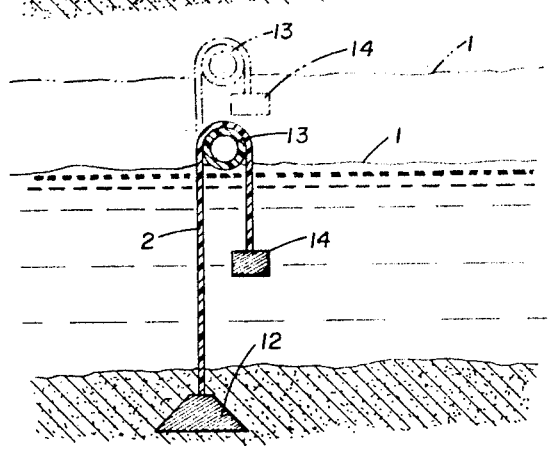

FIG. 5 is another modification of FIG. 3A wherein a heavy weight 12 is buried in the bottom of the body of water and is attached to the membrane. The membrane rises and is supported by a rolling floating means 13 which rides on the surface of the water going up and down with wave action or any rise and fall of the water level. The membrane is held taut by the weight 14 which is heavy enough to support the membrane in its position. The floating means 13 is not necessarily over weight 12, in fact it may be preferred to have them at a considerable horizontal direction from each other so as to provide a constant tension away from the shore.

Figure 6:
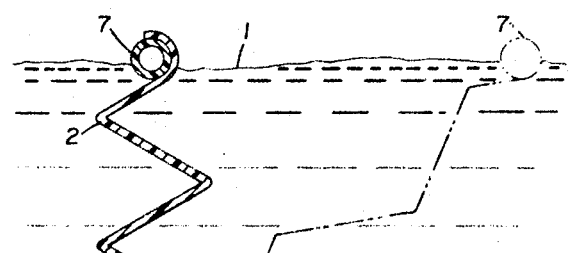

FIG. 6 is a modification of FIG. 3A wherein the membrane 2 itself is pleated, crimped, or tucked in such a way to provide scope which allows for any wave action or change in water level. The floating means 7 rides on the surface of the water and allows for a considerable deviation of the membrane in the event of violent wave action or a change in water level either inside or outside the confined area.

Figure 7:
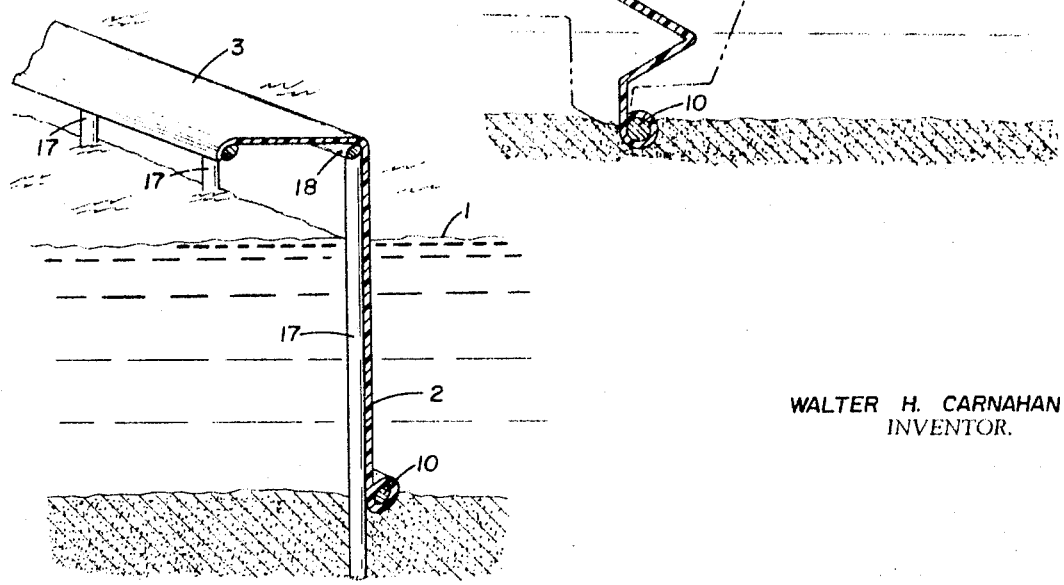

FIG. 7 shows the membrane 2 attached to a vertical support 17 and horizontal support 18, holding the membrane at any desired distance above the water. The apron is held up by support means, not shown, to reduce any spill of water from the unconfined area over the top of the membrane and into the confined area.

Figure 8:
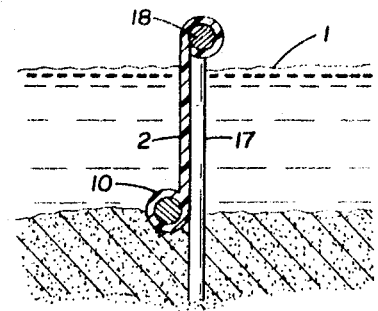

FIG. 8 shows a simple modification of FIG. 7 wherein the posts 17 hold a horizontal rigid member 18 around the confined area. The membrane 2 can be attached to the support 18 by lacing, cement, or the like. The weight means 10 hold the membrane 2 against the bottom of the body of water. It is seen that the support 17 must be high enough to hold the membrane above the surface of the water.

A horizontal membrane which extends from the top of the device outlining the swimming area like that shown in FIG. 3 may be used to deter the water from the large body of water from entering into the swimming area such as might happen from the action of small to medium size waves which are made by boating, small storms, wind, and the like, throwing the water by waves toward the confined area from the large body of water. In a preferred form, this horizontal membrance is perforated liberally and its outer edge is supported somewhat above the normal water level by a line of floats, or the like.

The bathing area of the persent invention is separated from the large body of water by a flexible, impermeable membrane which may be made from any suitable flexible material reinforced or not by cloth, wire mesh, fiber glass, or any suitable means well known in the art of making such membranes. Examples of useful materials for the membranes include polyethylene terephthalate; polyolefins, e.g., polyethylene; polyamide, e.g., nylon; polyester, e.g., Mylar; natural rubber; polyvinyl chloride; plastic-impregnated fabric; fiber glass-reinforced plastic sheeting; and the like. Also treated rubberized fabrics may be used.

The separatory membranes of the invention can be prepared in such form that the flotation member at the top can move inward or outward to compensate for changes in the relative levels of the water on either side of the membrane. Thus with a falling tide in a tidewater river, as the level outside the membrane drops, the flotation members would move out increasing the volume of the bathing pool until the water levels were equal. A rise in the water level outside would, on the other hand, cause the flotation members to move inward toward the shore of the bathing area reducing the volume until the water levels were the same on both sides of the membrane.

The above compensatory mechanism operates without changing the position of the bottom or weighting members. Sufficient material is provided between the flotation members and the weighting members to accommodate the maximum changes in volume which will be necessary to make up for the expected maximum variations in the water level of the body of water in which the bathing pool of the invention is installed. In the simplest embodiment, the extra material can simply lay on the bottom or float to the top when the membrane is in vertical position. However this exposes it to damage and the possibility of its becoming imbedded in slit or the like. Hence an important aspect of this feature of the invention is the provision of means to keep the excess material off the bottom and in a compact form so that it will not be a trap for debris, a hazard to swimmers, or the like.

Crimped, sinuous and other cross sectional forms of membranes can be employed. Similarly the extra material used to provide the desired scope in the separatory membrane to compensate for changes in water level can be held up by suitable secondary flotation means.

Accessory equipment may be provided to circulate a portion of the water through aerating, filtering, chlorinating, and salting or desalting equipment, or the like.

A bathing area embodying the present invention was placed into the water in an area having a sandy bottom with a minimum of pebbles. A pumping filtering device was then connected by pipes and its entry and exit ports placed in the separated area. The filtering device was turned on and the water in the separated area was then purified by continuous filtration. This proved to be low in cost, reliable in operation, and provides excellent swimming facilities for an area which is otherwise undesirable for swimming.

The segregated area for bathing withstands mild currents and mild wave action from the large body of water without any damage to the separatory membrane. The weighting means which is used to hold the membrane in position along the bottom of the body of water can be a cable, patched-in weights, loaded pipes, or any other material which is heavier than water and has sufficient density to maintain the bottom of the membrane at the bottom of the body of water.

This membrane can also be left slack or can be coiled in order to reduce the possibility of water being transferred from the contaminated area to the safe bathing area.

The suspending means can be a floating material over which the membrane can be attached by cement or other appropriate means. It can be made of cork, wood, plastic tubes, sealed hollow tubes of metal, drums, molded plastic foam pieces, and the like.

It is also within the limits of this invention to turn the top edge of the flexible membrane on itself to form a series of tubes to form the floating means. The floating tubes will preferably be formed in a series of separated sections so that if one section becomes deflated, no harm is done to the whole system.

The term "water impermeable, flexible membrane" as used in this invention to define the separatory member which contains the purified water is meant to include also semi-permeable membranes which pass water but prevent undesirable micro-organisms from going through the material.

I have found that the weight on the bottom of the membrane will imbed itself deeper into the sand with mild wave action or currents against the membrane. This has the advantage that any water passing into the bathing area under the weighting members would be filtered in passage.

In the event of a severe storm where the exterior membrane is exposed to violent wave action, the membrane can be readily detached from any support member that is used to outline the desired shape of the bathing area and allow it to collapse and be pulled into shore readily as no appreciable weight and no water must be transferred. The membrane can be installed again after the storm and the water in the area purified and refiltered in order to insure that the area is again safe for bathing.

The water impermeable membrane may optionally contain one or two flaps at the bottom of it which will extend along the bottom of the body of water in either or both directions from the vertical position. Aggregate or other material may be applied over the top of the flap in order to anchor it on the bottom. This particular arrangement has the additional advantage that any water passing under the membrane into the purified area is filtered through several feet of the sand or gravel bottom of the body of water.

This invention has been described in considerable detail with particular reference to certain preferred embodiments thereof, but it will be understood that variation and modifications can be effected within the spirit and scope of the invention as described hereinabove, and as defined in the appended claims.

I claim:

1. A structure for segregating a portion of an existing body of water, said portion comprising part of the edge and bottom, while maintaining essentially the same water level as the existing body of water comprising, (a) a flexible, water-impermeable membrane,
   (b) means to hold one edge of the membrane against the bottom of said existing body of water,
   (c) a supporting means at the other edge of the membrane to hold the membrane above the surface of the water, and
   (d) means to fasten the ends of the membrane on the shore,
   (e) said membrane further characterized by the addition of an apron, said apron extending out over the unconfined portion of the large body of water to reduce the flow of water from the unconfined into the confined portion by wave action.

2. The structure of claim 1 wherein the membrane is of a width greater than the depth of the water where the membrane is placed, containing means to hold the membrane as a whole in an essentially vertical position.

3. The structure of claim 1 wherein there is provided a means to treat said segregated portion of the large body of water.

4. The structure of claim 1 wherein said supporting means is a plurality of floating sections.

References Cited

UNITED STATES PATENTS

| | | | |
|---|---|---|---|
| 3,026,538 | 3/1962 | Boyd et al. | 4—171 |
| 3,078,472 | 2/1963 | Salisbury | 4—171 |
| 3,099,018 | 7/1963 | O'Connell | 4—171 |
| 3,327,667 | 6/1967 | Manning | 114—.5 |

LAVERNE D. GEIGER, Primary Examiner

U.S. Cl. X.R.

114—.5